July 18, 1933.   R. L. TRIPLETT   1,918,940
ELECTRICAL MEASURING INSTRUMENT
Filed Dec. 10, 1931

INVENTOR
RAY L. TRIPLETT,
BY Toulmin & Toulmin
ATTORNEYS

Patented July 18, 1933

1,918,940

UNITED STATES PATENT OFFICE

RAY L. TRIPLETT, OF BLUFFTON, OHIO

ELECTRICAL MEASURING INSTRUMENT

Application filed December 10, 1931. Serial No. 580,018.

This invention relates to improvements in electrical measuring instruments, and has for its object to provide an electrical measuring instrument in which the parts are concealed, but sufficient illumination and transparent windows are provided so that a reading of the measurements may be made.

It is particularly the object of this invention to provide an electrical measuring instrument inclosed within a housing or casing that has therein openings, closed by means of glass or celluloid so light can be easily transmitted through the openings or windows.

One of these openings is provided with an indicator upon which the shadow of an indicating arm is cast. The shadow is cast upon the indicator or dial by means of a light to the rear of the finger, and may be read on a translucent dial member located in front of the indicating finger, marks being provided on the dial for indicating purposes.

It is an object to provide a casing, one-half of which acts as a transparent closure, and has special means for supporting a translucent or transparent window, while the other half, constituting the back of the casing, is adapted to telescopically fit within and interlock in the first-mentioned half and to support the operating mechanism for the indicator, which can be seen through the window or reflected upon the window of the first half.

These and other advantages will appear from the following description taken in connection with the drawing.

Referring to the drawing.

Figure 1:
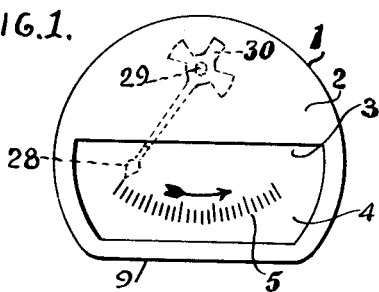
Figure 1 is a front elevation of the apparatus.
Figure 2:
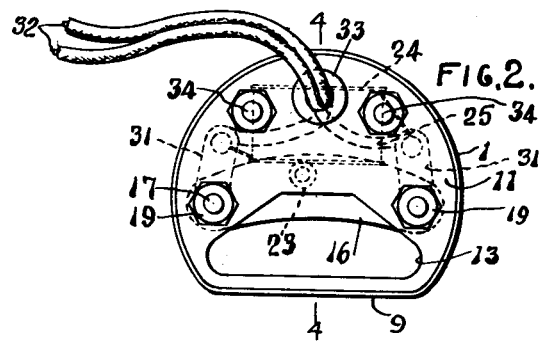
Figure 2 is a rear elevation.
Figure 3:
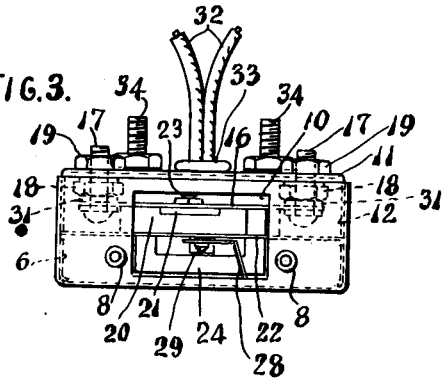
Figure 3 is a bottom plan view.

The numeral 1 is used to designate a casing which has an end 2, with an opening 3 therein. This casing is cylindrical in shape, with one side somewhat flattened, as indicated by Figure 1.

In the closed end of this casing and fitting over the opening 3 is a dial 4, composed of translucent material, such as celluloid. This dial is of such a nature that a shadow on the rear or inside of it can be seen from the outside, but it is not transparent in that you can see an object inside from the outside. On this dial is a scale 5 to indicate amperes or volts, as the case may be.

The dial is held in position on the casing by means of a band 6, which extends from one end of the flattened part of the casing, around to the other end of the flattened part of the casing adjacent the closed end, and has projecting from the side thereof, adjacent the dial, a flange 7 which abuts against the dial and holds it in close engagement with the closed end of the casing so that the dial is clamped. This band is held in position by means of brads 8.

The flat bottom part of the casing is indicated by the numeral 9, and has therein a hole 10 through which light may be admitted to the interior of the casing when it is closed by a suitable closure 11 in the open end. This closure is cup-shaped and has a peripheral flange 12 adapted to be inserted on the inside of the open end of the casing, and is held therein by friction between the casing and the closure. However, other means may be provided for holding the closure in position in the casing.

This closure has an opening 13 in the rear thereof, covered by means of a strip of celluloid 15. This strip of celluloid is clear, transparent and free from color so that light is freely transmitted through it into the interior of the casing so that a shadow on the dial finger may be cast upon the dial. This celluloid strip is held in position in the closure by means of a lining 14, which closely fits in the bottom of the closure and holds the colluloid strip in position in the bottom thereof.

A plate 16 is supported in the closure by means of screws 17, one at each end of the plate. The head of each screw abuts against the plate and is held in position with respect to the plate by means of a spacer nut 18. These spacer nuts are used not only to hold the plate rigidly on the screws but to space the plate from the bottom of the closure. Each of these screws 17 passes through a hole provided therefor in the bottom of the closure, and is held to the closure by means of a nut 19, threaded on the screw on the outside of the closure. By means of these screws and nuts the plate or bar 16 is rigidly held with relation to the closure and with relation to the casing when the closure is within the casing.

Suitably attached to and supported by the support plate or bar is an insulating block 20. Between this insulating block and the supporting bar is a substantially U-shaped permanent magnet 21, with its open end upward. This magnet is between the bar or plate 16 and the insulating block, while opposite these two on the insulating block is a fibrous plate 22. These parts are held together by means of a screw 23.

Supported above and on top of the insulating block is a hollow core member 24, which has formed thereon a coil 25. The core is hollow with a substantially rectangular opening extending therethrough. In one side of this opening and extending from edge to edge of the opening is a plate 26, which has formed on the upper edge thereof a U-shaped arm 27. This arm extends upwardly from the plate and downwardly in contact with the inside of the core opposite the side in which the plate is located.

This plate and arm form a housing or frame for supporting a needle 28, pivoted at the points 29 to the plate and the arm. The part of the needle adjacent the pivots is formed into a vane-like structure 30. This needle of aluminum with its vane formed of steel or some similar material, is acted upon by the permanent magnet to hold it in a fixed, given position at all times when the coil is free from current. The needle is normally in what might be termed zero position, and held in that position by the permanent magnet.

On each end of the supporting bar or plate and supported thereon by means of the screws 17 is an arm 31, attached to the free ends of which are wires 32 for conducting an electric current to the coils. These wires come into the closed end of the closure through an opening in which there is a ring insulation 33. The casing, when the closure is within the casing, together with the closure, are supported by means of screws 34 which pass through the closure, the lining 14 and the celluloid strip 15.

Adjacent the opening 16, or adjacent the opening 10, may be a light 35. The light passing through these openings from its source will cast a shadow of the needle upon the dial. In Figure 1 the dial is shown with the needle in its normal or zero position, when no current is being passed through the coil. The needle is held in this position due to the action of the permanent magnet. When a current is passing through the coil the needle is deflected, the amount of deflection depending upon the nature of the current passing through the coil.

The operating parts of this instrument are inclosed and thoroughly protected from foreign and exterior matter, and in order that the movements of the needle may be seen a light is used for casting a shadow along the dial and over the scale so that the amount of deflection of the needle may be read on the front of the apparatus, though the needle is concealed and not itself seen.

Figure 4:
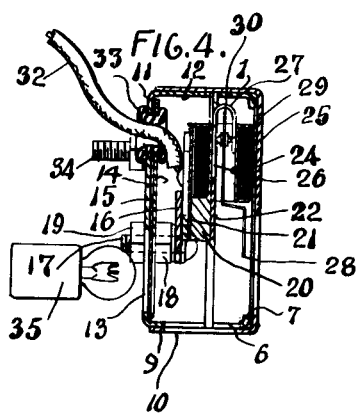
Figure 4 is a section on the line 4—4 of Figure 2.
Figure 5:
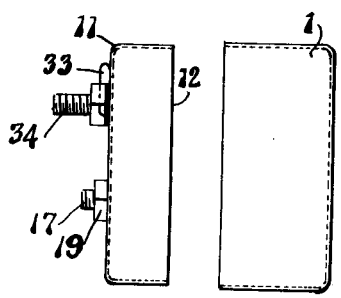
Figure 5 is a side elevation showing the two sections of the casing or housing removed from each other.
Figure 6:
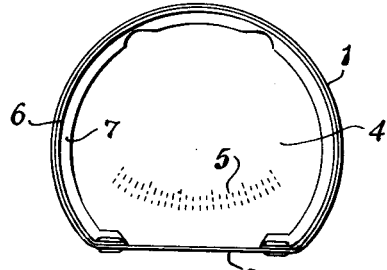
Figure 6 is an inside view of the front part of the casing.
Figure 7:
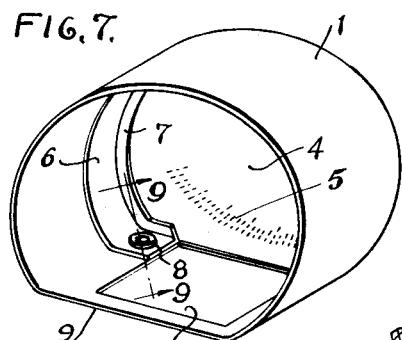
Figure 7 is a perspective view of the front part of the casing looking from the rear.
Figure 9:
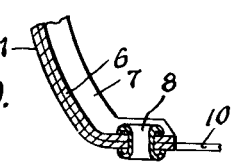
Figure 9 is a section on the line 9—9 of Figure 7.
Figure 8:
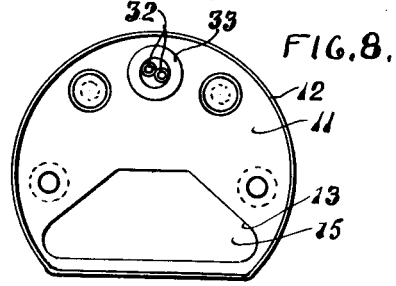
Figure 8 is a rear elevation of the closure.

The light may be placed in the position shown in Figure 4 or it may be placed beneath the casing so it will shine through the hole 10 in the bottom thereof.

It will be understood that I desire to comprehend within my invention such modifications as come within the scope of my claims.

Having thus fully described my invention, what I claim as new and desire to secure by Letters Patent, is:

1. In an electric measuring instrument, a casing having an opening closed by a translucent plate, an indicator in said casing adapted to swing along said plate, and a light so arranged with relation to the indicator that the indicator will cast a shadow on said plate and thereby indicate the position of the indicator.

2. In an electric measuring instrument, a casing having in one side a translucent dial and in the opposite side a transparent window for admitting light into the casing, and an indicator finger swinging between the dial and the window whereby light entering through the window will cast a shadow of the finger on the dial.

3. In an electric measuring instrument, a casing having in one side a translucent dial and in the opposite side a transparent light-transmitting window, an indicator finger suspended to swing between the dial and the window, a permanent magnet tending to hold said finger in one position, and electrical means to deflect the finger against the action of the magnet.

4. In an electric measuring instrument, a casing open at one end and closed at the other end except for an opening adjacent one side, a translucent dial forming a closure for said opening, a plate attached to the side of the casing for holding the closure in place, and an indicator finger suspended to swing across the closure.

5. In an electric measuring instrument, a casing open at one end and closed at the other end except for an opening adjacent one side, a translucent plate forming a dial for said opening, means attached to the sides of the casing for holding the plate in place, a closure for the open end of said casing, and an electric current-responsive means on the closure.

6. In an electric measuring instrument, a casing open at one end and closed at the other end except for an opening adjacent one side, a translucent plate forming a dial for said opening, means attached to the sides of the casing for holding the plate in place, a closure for the open end of said casing, and an electric current-responsive means on the closure, said current-responsive means including a finger suspended to swing across the opening.

7. In an electric measuring instrument, a casing open at one end and closed at the other end except for an opening adjacent one side, a translucent plate forming a dial for said opening, means attached to the sides of the casing for holding the plate in place, a closure for the open end of said casing, and an electric current-responsive means on the closure, said current-responsive means including a coil and a finger suspended in the coil to swing across the opening.

8. In an electric measuring instrument, a casing open at one end and having a translucent window in the other end, a closure for the open end, and electric current-responsive means on the closure within the casing, said means including a finger suspended to swing across the window.

9. In an electric measuring instrument, a casing open at one end and having a translucent window in the other end, a closure for the open end, and an electric indicating means on said closure within the casing, said means including a coil and a finger suspended in said coil to swing across the window.

10. In an electric measuring instrument, a casing open at one end and having a translucent window in the other end, a closure for the open end of the casing, a bar supported on the closure within the casing, a coil on said bar, a finger pivoted in the coil to swing across the window, and a permanent magnet tending to hold the finger in one position, said finger being swung by an electric current passing through the coil.

11. In an electric measuring machine, a housing consisting of a casing and a closure for the casing, a translucent window forming a dial in the casing, a transparent window in the closure, a plate supported by the closure in the casing, a coil on the plate, a permanent magnet on the plate adjacent the coil, and a finger pivoted in the coil for swinging across the dial, said magnet tending to hold the finger in one position while a current through the coil will move the finger across the dial.

12. In an electric measuring machine, a housing consisting of a casing and a closure for the casing, a translucent window forming a dial in the casing, a transparent window in the closure, a finger suspended in the housing to swing across the dial, a magnet tending to hold the finger in one position, and a coil adapted to cause the finger to swing against the action of the magnet when an electric potential difference is impressed upon the coil.

13. In an electric measuring instrument, a housing having oppositely disposed windows, one closed by a translucent dial and the other by a transparent material, an indicator in said housing having a finger extending between the windows, and means to supply light to the housing through the transparent window whereby a shadow of the finger will be cast upon the dial.

14. In an electric measuring instrument, a housing having oppositely disposed windows, one closed by a translucent dial and the other by a transparent material, an indicator finger pivotally supported to swing between the windows, means tending to hold the finger in one position, and means consisting of a coil to deflect the finger whereby the current through the coil may be measured by the deflection of the finger across the dial.

15. In an electric measuring instrument, a housing having a translucent dial and a scale thereon, and an electrical indicating means in the housing, said means including a finger pivoted to swing close to the dial, said housing having an opening for the admission of light to the finger and the dial, whereby the finger makes a shadow on the dial.

16. In an electric measuring instrument, a housing having a translucent dial and a scale thereon, and an electrical indicating means in the housing, said means including a finger pivoted to swing close to the dial, means tending to hold the finger in a fixed position, and means to swing the finger across the dial, said housing having an opening for the admission of light to the finger and the dial, whereby the finger makes a shadow on the dial.

17. In a case for an electrical indicating instrument, a casing portion having an open end on one side for the reception of an instrument and a closed end on the other side having a window, a plate of window material mounted within said casing, and a flange mounted within said casing engaging said window and holding it between the flange and the inside of the casing.

18. In a case for an electrical indicating instrument, a casing portion having an open end on one side for the reception of an instrument and a closed end on the other side having a window, a plate of window material mounted within said casing, and a flange mounted within said casing engaging said window and holding it between the flange and the inside of the casing, and a telescopically mounted instrument supporting casing section having a light receiving aperture in the wall thereof that becomes the rear closure for the assembled casing, whereby when the two halves of the casing are assembled a window will be supported in the front half, an instrument supported in the rear half and light behind the rear half can pass through one wall thereof and cast a reflection from a part of the instrument onto the window carried by the front wall.

19. In combination, a casing provided with an annular side wall having a light port, an open back and a window in the front, a window-pane in the front, and an annular ring attached to said casing adapted to hold said window in position between it and the casing.

RAY L. TRIPLETT.

mounted within said casing engaging said window and holding it between the flange and the inside of the casing.

18. In a case for an electrical indicating instrument, a casing portion having an open end on one side for the reception of an instrument and a closed end on the other side having a window, a plate of window material mounted within said casing, and a flange mounted within said casing engaging said window and holding it between the flange and the inside of the casing, and a telescopically mounted instrument supporting casing section having a light receiving aperture in the wall thereof that becomes the rear closure for the assembled casing, whereby when the two halves of the casing are assembled a window will be supported in the front half, an instrument supported in the rear half and light behind the rear half can pass through one wall thereof and cast a reflection from a part of the instrument onto the window carried by the front wall.

19. In combination, a casing provided with an annular side wall having a light port, an open back and a window in the front, a window-pane in the front, and an annular ring attached to said casing adapted to hold said window in position between it and the casing.

RAY L. TRIPLETT.

DISCLAIMER 1,918,940.—*Ray L. Triplett*, Bluffton, Ohio. ELECTRICAL MEASURING INSTRUMENT. Patent dated July 18, 1933. Disclaimer filed October 30, 1933, by the patentee.
Hereby enters a disclaimer limiting claim 1 of said patent as follows:
By restricting claim 1 to a combination wherein a source of light is exteriorly disposed of the casing, in which casing a window is provided for admitting the light into the casing.
[*Official Gazette November 28, 1933.*]

DISCLAIMER 1,918,940.—*Ray L. Triplett*, Bluffton, Ohio. ELECTRICAL MEASURING INSTRUMENT.
Patent dated July 18, 1933. Disclaimer filed October 30, 1933, by the patentee.

Hereby enters a disclaimer limiting claim 1 of said patent as follows:

By restricting claim 1 to a combination wherein a source of light is exteriorly disposed of the casing, in which casing a window is provided for admitting the light into the casing.

[*Official Gazette November 28, 1933.*]